US008689613B2

(12) United States Patent
Perry

(10) Patent No.: US 8,689,613 B2
(45) Date of Patent: Apr. 8, 2014

(54) LEAK DETECTION METHOD AND SYSTEM FOR A HIGH PRESSURE AUTOMOTIVE FUEL TANK

(75) Inventor: Paul D. Perry, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 376 days.

(21) Appl. No.: 13/246,923

(22) Filed: Sep. 28, 2011

(65) Prior Publication Data

US 2013/0074583 A1 Mar. 28, 2013

(51) Int. Cl.

| | |
|---|---|
| ***G01M 3/04*** | (2006.01) |
| ***G01M 3/00*** | (2006.01) |
| ***G01M 15/00*** | (2006.01) |
| ***F02M 33/02*** | (2006.01) |
| ***G01F 17/00*** | (2006.01) |

(52) U.S. Cl.
USPC ....... 73/49.7; 73/40.5 R; 73/114.39; 123/519; 702/51

(58) Field of Classification Search
USPC ......... 73/40.5 R, 49.7, 114.39; 123/519, 520; 702/51
See application file for complete search history.

(56) References Cited

U.S. PATENT DOCUMENTS

| | | | | |
|---|---|---|---|---|
| 5,105,789 A | 4/1992 | Aramaki et al. | | |
| 5,150,689 A | 9/1992 | Yano et al. | | |
| 5,333,590 A * | 8/1994 | Thomson | ....................... | 123/520 |
| 6,321,727 B1 * | 11/2001 | Reddy et al. | .................. | 123/520 |
| 6,782,874 B1 * | 8/2004 | Matsumoto | .................... | 123/520 |
| 7,373,799 B2 * | 5/2008 | McLain et al. | ................. | 73/1.58 |
| 7,448,367 B1 * | 11/2008 | Reddy et al. | .................. | 123/520 |
| 2003/0051540 A1 | 3/2003 | Morinaga | | |
| 2006/0081035 A1 * | 4/2006 | McLain et al. | ................. | 73/49.3 |
| 2013/0139792 A1 * | 6/2013 | Perry et al. | .................... | 123/520 |

FOREIGN PATENT DOCUMENTS

| | | |
|---|---|---|
| WO | 9849439 A1 | 11/1998 |
| WO | 9918419 A1 | 4/1999 |

OTHER PUBLICATIONS

Search Report and the Written Opinion of the International Search Authority, PCT/US2012/056039, Jan. 2, 2013.

* cited by examiner

*Primary Examiner* — Hezron E Williams
*Assistant Examiner* — Nathaniel Kolb

(57) ABSTRACT

A vapor management system (10) includes a fuel tank (12), a canister (14), a pressure control valve (16) between the tank and canister and defining a high pressure side (34) and a low pressure side (32), a vacuum source (18), a purge valve (19) between the canister and vacuum source, a leak detection valve (20) connected with the canister and including a processor (30). A pressure sensor (24) and a temperature sensor (26) are disposed in a fuel vapor cavity of the fuel tank, with signals from the sensors being received by the processor. Based on an absolute temperature measured by the temperature sensor, the processor compares a predicted pressure in the fuel tank to the measured absolute pressure, and identifies a leak on the high pressure side if the predicted pressure is outside a tolerance range, while maintaining pressure in the fuel tank.

14 Claims, 4 Drawing Sheets

LEAK DETECTION METHOD AND SYSTEM FOR A HIGH PRESSURE AUTOMOTIVE FUEL TANK

FIELD OF THE INVENTION

This invention relates to vapor management systems of vehicles and, more particularly, to a leak detection method and system for high pressure automotive fuel tank.

BACKGROUND OF THE INVENTION

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, there is a need to avoid releasing fuel vapors into the atmosphere, and to provide an apparatus and a method for performing a leak diagnostic, so as to comply with these standards.

An automotive leak detection on-board diagnostic (OBD) determines if there is a leak in the vapor management system of an automobile. The vapor management system can include the fuel tank headspace, the canister that collects volatile fuel vapors from the headspace, a purge valve and all associated hoses. These systems, however require pressure to be bled-off before tank diagnostics can be run.

In some vehicle applications (e.g., plug-in hybrid) the fuel tank is held at elevated pressures in order to suppress the evaporation of gasoline, and therefore reduce the need to store and process any vented gasoline vapor.

Thus, there is a need for a diagnostic method and system to detect vapor leakage in a high pressure fuel tank environment, while maintaining pressure in the tank.

SUMMARY OF THE INVENTION

An object of the invention is to fulfill the need referred to above. In accordance with the principles of the present invention, this objective is achieved by a method of determining a leak in a vapor management system of a vehicle. The system includes a fuel tank; a vapor collection canister; a tank pressure control valve between the tank and canister and defining a high pressure side, including the fuel tank, and a low pressure side, including the canister; a vacuum source; a purge valve between the canister and vacuum source; and a leak detection valve connected with the canister. The leak detection valve includes a processor. The method determines if there is a leak on the low pressure side, using a first algorithm executed by the processor, based on determining the existence of a vacuum at a predetermined pressure level. A pressure sensor and a temperature sensor are provided in a fuel vapor cavity of the fuel tank, with signals from the sensors being received by the processor. Based on a vapor absolute temperature measurement from the temperature sensor, pressure is predicted in the fuel tank. An absolute pressure is measured in the fuel tank with the pressure sensor. The predicted pressure is compared to the absolute pressure. A leak on the high pressure side is identified if the predicted pressure is outside a tolerance range, while maintaining pressure in the fuel tank.

In accordance with another aspect of the invention, a vapor management system for a vehicle includes a fuel tank; a vapor collection canister; a tank pressure control valve connected between the tank and canister, the control valve defining a high pressure side, including the fuel tank, and a low pressure side, including the canister; a vacuum source; a purge valve connected between the canister and vacuum source; a leak detection valve connected with the canister, the leak detection valve including a processor; and a pressure sensor and a temperature sensor. Each sensor is disposed in a fuel vapor cavity of the fuel tank, with signals from the sensors being received by the processor. The pressure sensor is constructed and arranged to measure absolute pressure and the temperature sensor is constructed and arranged to measure absolute vapor temperature in the fuel tank. Based on a temperature measured by the temperature sensor, the processor is constructed and arranged to compare a predicted pressure in the fuel tank to an absolute pressure measured by the pressure sensor, and to identify a leak on the high pressure side if the predicted pressure is outside a tolerance range, while maintaining pressure in the fuel tank.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which.

DETAILED DESCRIPTION OF THE EXEMPLARY EMBODIMENT

Figure 1:
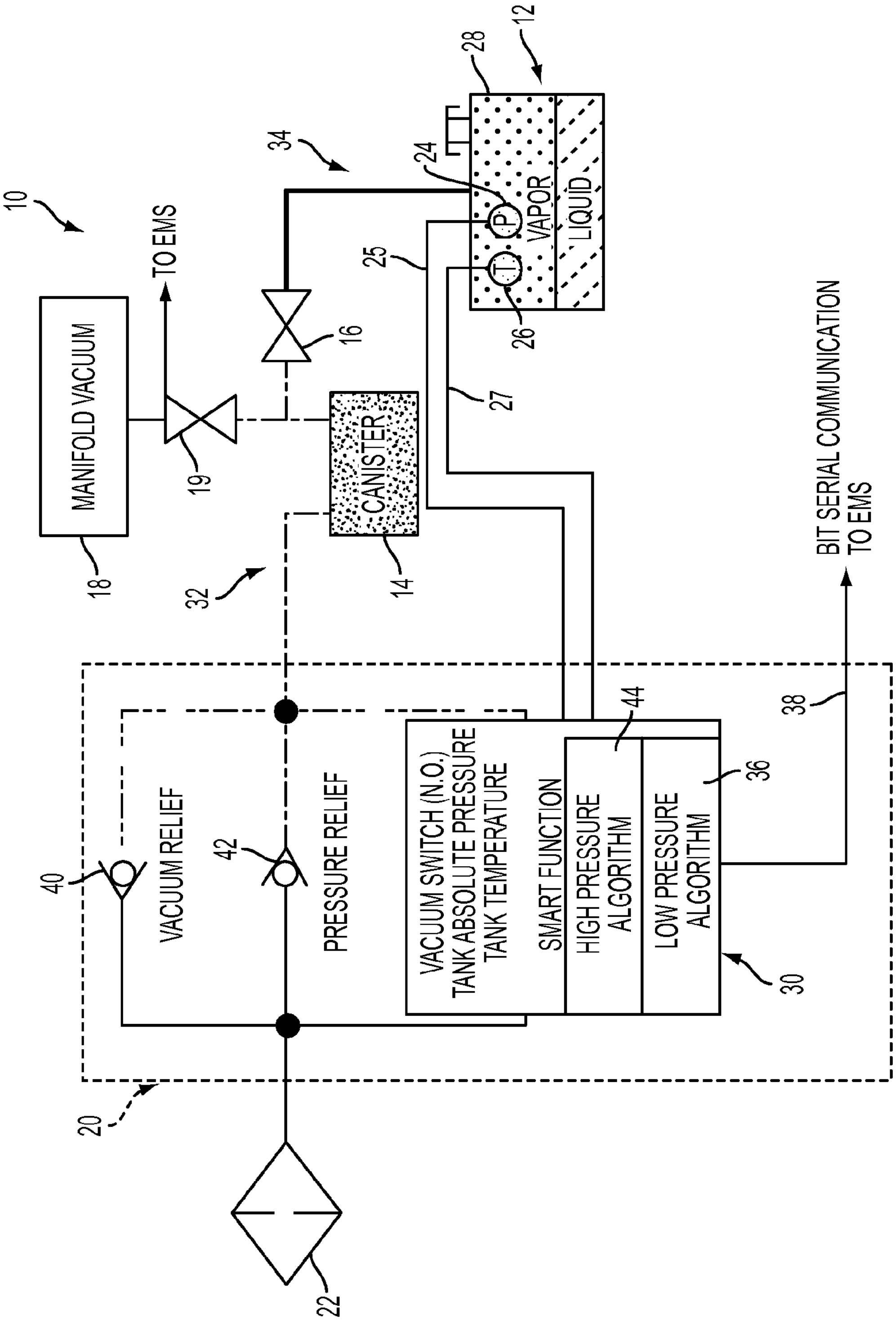
FIG. 1 is a schematic illustration showing a diagnostic vapor management system for detecting vapor leakage in a high pressure fuel tank environment, according to an embodiment of the present invention.

Referring to FIG. 1, a diagnostic vapor management system for a high pressure fuel tank is shown, generally indicated at 10, in accordance with an embodiment. The high pressure (sometimes called "non-integrated") system 10 comprises of a fuel tank, generally indicated at 12, a charcoal, vapor collection canister 14, a tank pressure control valve 16 between the canister 14 and tank 12, vacuum source 18, such as an intake manifold of the engine, a purge valve 19 between the canister 14 and vacuum source 18, a leak detection valve, generally indicated at 20, and a filter 22. An absolute pressure sensor 24 and a temperature sensor 26 are located within the vapor cavity 28 of the fuel tank 12. In the embodiment, the pressure sensor 24 and temperature sensor 26 are electrically connected to a processor, generally indicated at 30, within the leak detection valve 20. If desired, the processor 30 can be provided remote from the leak detection valve 20.

It is understood that volatile liquid fuels, e.g., gasoline, can evaporate under certain conditions, e.g., rising ambient temperature, thereby generating fuel vapor. Fuel vapors that are generated within headspace 28 of tank 12 are collected in the vapor collection canister 14. At times conducive to canister purging, the collected vapors are purged from canister 14 to the engine (not shown) through the purge valve 19. The canister 14 vents to atmosphere through the particulate filter 22, allowing engine manifold vacuum 18 to draw air into and through canister 14 where collected vapors entrain with the air flowing through the canister and are carried into the engine intake system, and ultimately into engine where they are combusted.

The system 10 is divided into two parts by the tank pressure control valve 14. A low pressure side, generally indicated at 32, is shown in gray in FIG. 1 and includes the canister 16, while a high pressure side, generally indicated at 34, is shown in black in FIG. 1 and includes the fuel tank 12. The system 10 is preferably for use in a plug-in hybrid tank system.

Leak diagnostic on the low pressure side 32 is conducted by the leak detection valve 20, using a first, or low pressure algorithm 36 executed by the processor 30, in a manner described in U.S. Pat. No. 7,004,014, the content of which is hereby incorporated by reference into this specification. In particular, in the course of cooling that is experienced by the system 10, e.g., after the engine is turned off, a vacuum is naturally created by cooling the fuel vapor and air, such as in the headspace 28 of the fuel tank 12 and in the charcoal canister 14. The existence of a vacuum at a predetermined pressure level indicates that the integrity of the system 10 is satisfactory. Thus, signaling 38, sent to an engine management system (EMS), is used to indicate the integrity of the system 10, e.g., that there are no appreciable leaks. Subsequently, a vacuum relief valve 40 at a pressure level below the predetermined pressure level, protects the fuel tank 12 by preventing structural distortion as a result of stress caused by vacuum in the system 10.

After the engine is turned off, the pressure relief or blow-off valve 42 allows excess pressure due to fuel evaporation to be vented, and thereby expedite the occurrence of vacuum generation that subsequently occurs during cooling. The pressure blow-off 42 allows air within the system 10 to be released while fuel vapor is retained. Similarly, in the course of refueling the fuel tank 12, the pressure blow-off 42 allows air to exit the fuel tank 12 at a high rate of flow.

While the high pressure side 34 could be equalized with the low pressure side 32 for the purpose of conducting a leak check on the entire system 10, this would eliminate the advantage of holding fuel tank at elevated pressure. The pressure sensor 24 and temperature sensor 26 allow a second, or high pressure algorithm 44 executed by the processor 30 to detect a leak on the high pressure side 34 without the need to vent the tank pressure through the canister 14, as explained below.

At any time (engine on or off), the tank absolute pressure and temperature are measured by the two sensors 24 and 26, respectively, with signals 25, 27 thereof being received by the processor 30. These measured values can be called Absolute Pressure (AP) and Temperature (AT). At some regular interval, e.g., every 10 minutes, AT and AP are continually measured. Typical values of AP range from about 95-102 kPa absolute, and typical values of AT range from about 270-285° C. absolute. If the system 10 has zero leakage, the pressure in the tank 12 should vary with respect to the temperature in a predictable and repeatable fashion. This behavior is presented in FIG. 2 that shows both the measured, actual pressure 46 and the predicted pressure 48. If the predicted pressure 48 substantially equals the actual, measured pressure 46 then no vapor leak exists.

The Predicted Pressure (PP) in the fuel tank is calculated as follows:

Given:

AP=absolute (measured) total pressure at time zero

PP=absolute predicted total pressure at time t $AT_t$=temperature at time t $pp_{air}$=partial pressure of air $pp_{vapor}$=partial pressure of vapor The total absolute pressure is a sum of the two partial pressures:

$$AP=pp_{air}+pp_{vapor}$$

Figure 3:
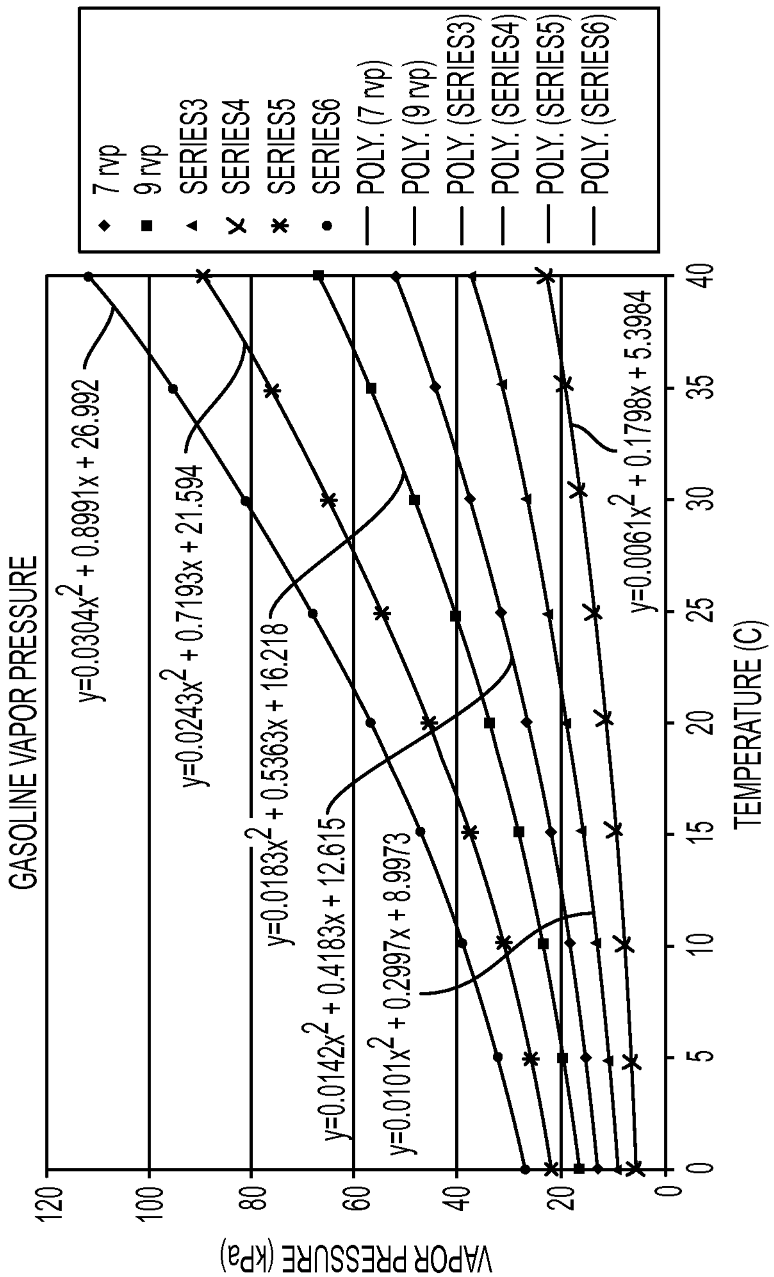
FIG. 3 is a graph of gasoline partial pressure.

First, the partial pressure of gasoline vapor is predictable and can be determined from empirical data as shown in FIG. 3. An assumption must be made that the gasoline has 'weathered' somewhat so that the reed vapor pressure (RVP) is low (e.g., RVP is 7 psi). For example, from FIG. 3, the partial pressure gasoline can be calculated for any temperature by:

$$pp_{vapor}=0.0061T^2+0.1798T+5.3984 \text{ (using the curve for RVP=7 from FIG. 3).}$$

Thus, at time zero the partial pressure of air can be calculated using the measured pressure $AP_0$ and the partial pressure of gasoline from FIG. 3.

$$pp_{air\ 0}=AP_0-pp_{vapor\ 0}$$

Now at any time t, using the measured temperature $AT_t$ $$pp_{air\ t}=(AT_0/AT_t)*pp_{air\ 0} \text{ (using the gas law)}$$

so at time t, the new absolute (predicted) pressure can be calculated by re-combining the two partial pressures:

$$PP_t=pp_{air\ t}+pp_{vapor} \text{ (using } pp_{vapor\ t} \text{ from FIG. 3)}$$

Figure 2:
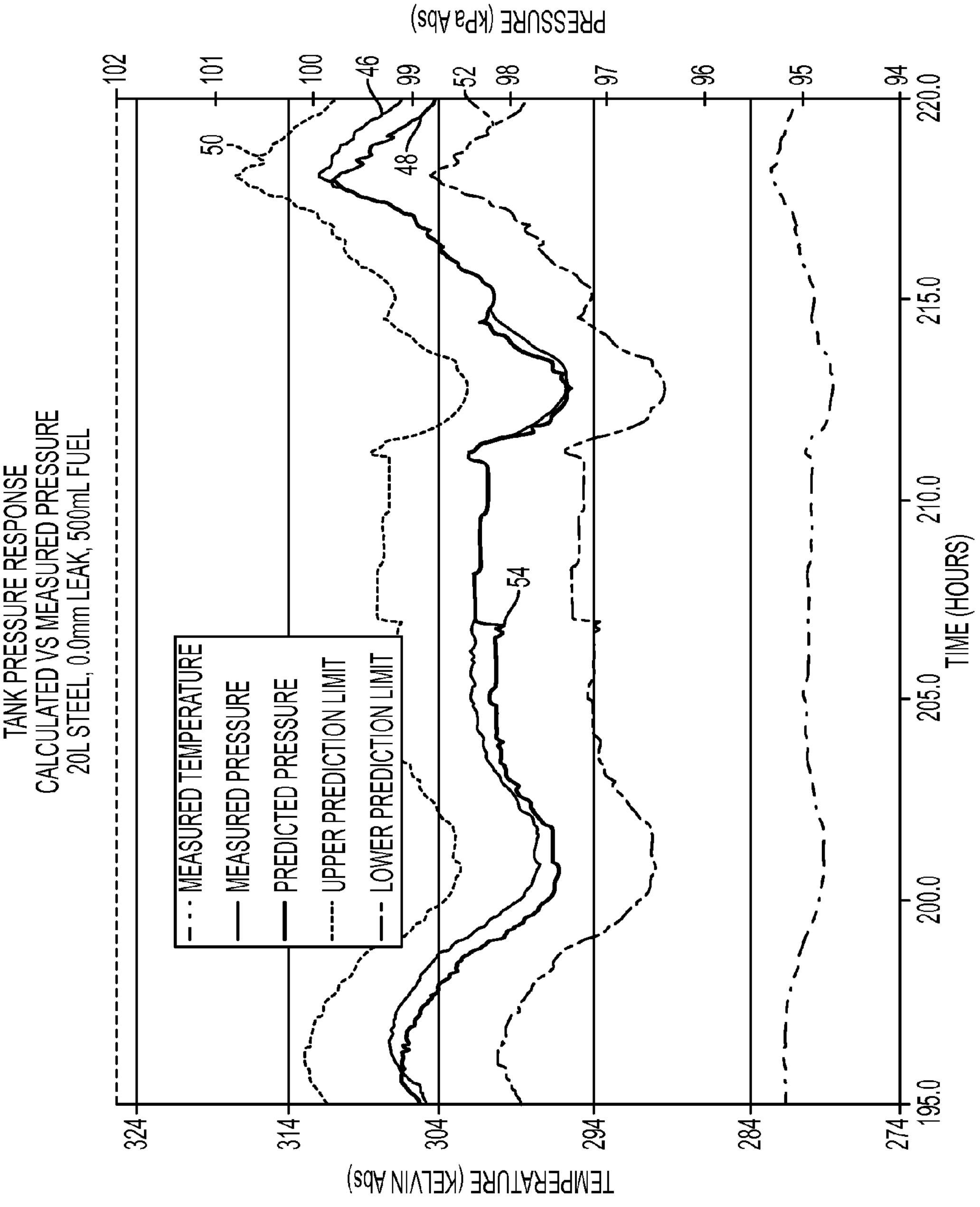
FIG. 2 is graph of fuel tank pressure response to tank temperature.

With reference to FIG. 2, to give some allowance for measurement error, upper pressure tolerance band 50 and the lower pressure tolerance bands 52 can be calculated. For the example in FIG. 2, tolerance bands of ±1% (e.g., $0.01\times PP_t$) are calculated. However, the tolerance bands can be in the range of ±0.5% to ±5.0%. If the Predicted Pressure (PP) falls within the upper and lower tolerances 50 and 52, the system 10 is judged to be 'tight' or zero leakage.

In the above example and with reference to FIG. 2, the small step 54 in the predicted pressure curve 48 at approximately 206 hours was generated by 'resetting' the algorithm 44. At this time in the data, a new $AP_0$ was established and the calculation of PP was resumed. Note that at the new 'time zero' AP and PP will necessarily be equal.

Figure 4:
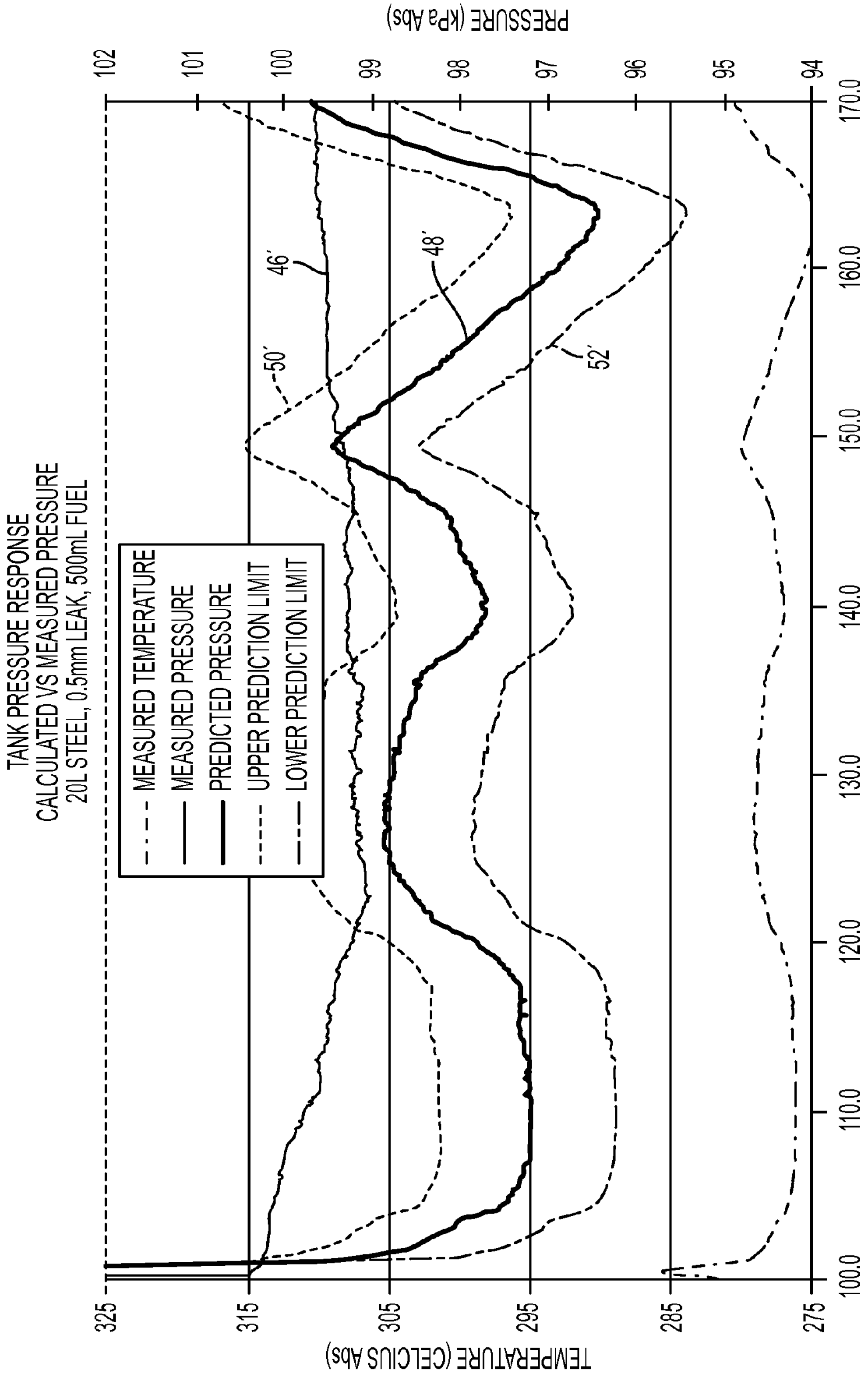
FIG. 4 is graph of fuel tank pressure response to tank temperature when a leak orifice is provided in the tank under test.

To prove the effectiveness of the system 10, with reference to FIG. 4, tank pressure response is shown when a 0.5 mm leak orifice is added to the tank 12 under test to simulate a leak. As FIG. 4 demonstrates, the measured pressure 46' does not follow the predicted pressure 48' since there is a loss of air and vapor through the 0.5 mm leak orifice. As noted above, if there was no leak, the measured pressure would substantially follow the predicted pressure.

For a robust test, a pass/fail decision should not be made unless a defined temperature change is experienced. For example, if the temperature change from $AT_0$ to $AT_t$ is zero, then the predicted pressure change would also be zero. Zero pressure change would occur if the system were tight, or if there was a very large leak, therefore a leak determination cannot be made.

In the embodiment, the following logic should be satisfied to complete a leak diagnostic:

If $(AT_t-AT_0)\leq x$ then NO TEST POSSIBLE

If $(AT_t-AT_0) \geq x$ and $(PP_t \neq AP_t)$ then Leak Detected $(AT_t-AT_0) \geq x$ and $(PP_t = AP_t)$ then Leak Test Pass Thus, with the system 10, using in-tank temperature measurement, preferably during a vehicle-off period, the tank pressure trend is predicted using the gas law and partial pressure laws. By comparing the predicted pressure to the actual pressure using algorithm 44, the leak rate of the high pressure side 34 of the system 10 can be determined. The system 10 provides a passive, non-intrusive method of detecting leakage in a high pressure fuel tank. Conventional systems must bleed pressure off before tank diagnostics can run. With the system 10, the high and low pressure sides 34, 32 can be diagnosed separately so that no pressure needs to be bled-off during diagnosing the high pressure side.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of determining a leak in a vapor management system of a vehicle, the system including a fuel tank; a vapor collection canister; a tank pressure control valve between the tank and canister and defining a high pressure side, including the fuel tank, and a low pressure side, including the canister; a vacuum source; a purge valve between the canister and vacuum source; and a leak detection valve connected with the canister, the leak detection valve including a processor, the method comprising the steps of:

determining if there is a leak on the low pressure side, using a first algorithm executed by the processor, based on determining an existence of a vacuum at a predetermined pressure level, providing a pressure sensor and a temperature sensor in a fuel vapor cavity of the fuel tank, with signals from the sensors being received by the processor, based on a vapor absolute temperature (AT) measurement from the temperature sensor, predicting pressure (PP) in the fuel tank, measuring an absolute pressure (AP) in the fuel tank with the pressure sensor, comparing the predicted pressure (PP) to the absolute pressure (AP), and identifying a leak on the high pressure side if the predicted pressure (PP) is outside a tolerance range, while maintaining pressure in the fuel tank wherein the predicted pressure (PP) at a certain time t is calculated for gasoline by $PP_t = pp_{air\ t} + pp_{vapor}$ where $pp_{air\ t}$ is the partial pressure of air in the fuel tank at time t, and $pp_{vapor}$ is the partial pressure of fuel vapor in the fuel tank at time t.

2. The method of claim 1, wherein the tolerance range is ±0.5% to ±5.0% of the predicted pressure (PP).

3. The method of claim 2, wherein the tolerance range is ±1% of the predicted pressure (PP).

4. The method of claim 1, wherein a leak is identified only if $(AT_t-AT_0) \geq x$ and $(PP_t \neq AP_t)$, where x is greater than zero.

5. The method of claim 1, wherein $pp_{vapor} = 0.0061T^2 + 0.1798T + 5.3984$, and $pp_{air\ t} = (AT_0/AT_t)*pp_{air\ 0}$.

6. The method of claim 1, wherein the actual pressure (AP) is in a range from about 95-102 kPa absolute.

7. A vapor management system for a vehicle comprising:

a fuel tank;

a vapor collection canister;

a tank pressure control valve connected between the tank and canister, the control valve defining a high pressure side, including the fuel tank, and a low pressure side, including the canister;

a vacuum source;

a purge valve connected between the canister and vacuum source;

a leak detection valve connected with the canister, the leak detection valve including a processor, and a pressure sensor and a temperature sensor, each disposed in a fuel vapor cavity of the fuel tank, with signals from the sensors being received by the processor, the pressure sensor being constructed and arranged to measure absolute pressure and the temperature sensor being constructed and arranged to measure absolute vapor temperature in the fuel tank, wherein, based on the absolute temperature measured by the temperature sensor, the processor is constructed and arranged to compare a predicted pressure in the fuel tank to the absolute pressure measured by the pressure sensor, and to identify a leak on the high pressure side if the predicted pressure is outside a tolerance range, while maintaining pressure in the fuel tank, and wherein the predicted pressure (PP) at a certain time t is calculated for gasoline by $PP_t = pp_{air\ t} + pp_{vapor}$ where $pp_{air\ t}$ is the partial pressure of air in the fuel tank at time t, and $pp_{vapor}$ is the partial pressure of fuel vapor in the fuel tank at time t.

8. The system of claim 7, wherein processor is constructed and arrange to identify a leak if the predicted pressure is outside the tolerance range of ±0.5% to ±5.0% of the predicted pressure.

9. The system of claim 8, wherein processor is constructed and arranged to identify a leak if the predicted pressure is outside the tolerance range of ±1% of the predicted pressure.

10. A vapor management system for a vehicle comprising:

a fuel tank;

means for collecting vapor;

means for controlling pressure in the fuel tank, the means for controlling pressure being connected between the fuel tank and the means for collecting vapor, the means for controlling pressure defining a high pressure side, including the fuel tank, and a low pressure side, including the means for collecting vapor;

means for providing a vacuum source;

means for purging, connected between the means for collecting vapor and the means for proving a vacuum source; and a leak detection valve connected with the means for collecting vapor, means for processing data, and means for sensing absolute pressure and means for sensing absolute temperature, each means for sensing being disposed in a fuel vapor cavity of the fuel tank, with signals from each means for sensing being received by the means for processing, wherein, based on the absolute temperature measured from the means for sensing temperature, the means for processing compares a predicted pressure in the fuel tank to the absolute pressure measured by the means for sensing pressure, and identifies a leak on the high pressure side if the predicted pressure is outside a tolerance range, while maintaining pressure in the fuel tank, and wherein the predicted pressure (PP) at a certain time t is calculated for gasoline by $PP_t = pp_{air\ t} + pp_{vapor}$ where $pp_{air\ t}$ is the partial pressure of air in the fuel tank at time t, and $pp_{vapor}$ is the partial pressure of fuel vapor in the fuel tank at time t.

11. The system of claim 10, wherein the means for processing identifies a leak if the predicted pressure is outside the tolerance range ±0.5% to ±5.0% of the predicted pressure.

12. The system of claim 11, wherein means for processing identifies a leak if the predicted pressure is outside the tolerance range of ±1% of the predicted pressure.

13. The system of claim 10, wherein the means for processing is a processor constructed and arranged to execute an algorithm.

14. The system of claim 13, wherein the processor is part of the leak detection valve.

* * * * *